United States Patent Office 3,351,630
Patented Nov. 7, 1967

3,351,630
α-SUBSTITUTED-3-INDOLYL ACETIC ACID COMPOUNDS AND PROCESSES FOR THEIR PREPARATION
Tsung-Ying Shen, Westfield, N.J., assignor to Merck & Co., Inc., Rahway, N.J., a corporation of New Jersey
No Drawing. Filed Jan. 27, 1966, Ser. No. 523,291
15 Claims. (Cl. 260—326.12)

This application is a continuation-in-part of my copending application of Ser. No. 348,302, filed Feb. 28, 1964, which is now abandoned.

This invention relates to new chemical compounds. More particularly, it relates to a new class of compounds of the indole series. Still more particularly, it relates to α-hydroxy, alkoxy, and acyloxy 3-indolyl acetic acid compounds having an aromatic carboxylic acyl radical (aroyl) of less than three fused rings attached to the nitrogen atom of the indole ring and with salts, amides, anhydrides, and esters of each compound and to processes for the preparation thereof. The new indolyl acetic acid compounds of this invention may be represented by the general structural formula:

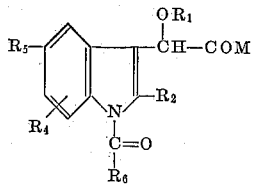

wherein: $R_1$ is selected from the group consisting of hydrogen, lower alkyl, lower alkenyl, lower alkynyl, ar-lower alkyl, halo lower alkyl, dihalo lower alkyl, lower alkanoyl, lower alkenoyl, lower alkynoyl, aroyl, ar-lower alkanoyl, and halo lower alkanoyl;
$R_2$ is selected from the group consisting of lower alkenyl and lower alkyl;
$R_4$ is selected from the group consisting of hydrogen, lower alkyl, lower alkoxy, fluorine, and trifluoromethyl;
$R_5$ is selected from the group consisting of hydroxy, lower alkyl, lower alkoxy, nitro, amino, lower alkylamino, di(lower alkyl)amino, bis(hydroxy lower alkyl)amino, 1-pyrrolidino, 4-methyl-1-piperazinyl, 4-morpholinyl, cyano, trifluoromethyl, halogen, di(lower alkyl)sulfamyl, benzylthio, lower alkylbenzylthio, lower alkoxybenzylthio, halogenobenzylthio, benzyloxy, lower alkylbenzyloxy, lower alkoxybenzyloxy, halobenzyloxy, lower alkenyl, lower alkenyloxy, lower alkynyloxy, 1-azacyclopropyl, cyclopropylmethyloxy, and cyclobutylmethyloxy;
$R_6$ is an aryl such as a phenyl, naphthyl, or biphenyl radical and substituted phenyl, naphthyl or biphenyl radical wherein any substituents other than hydrogen are selected from the group consisting of halogen, lower alkyl, lower alkylthio, lower alkoxy, trifluoromethyl, phenoxy, lower alkylphenoxy, lower alkoxyphenoxy, halogenophenoxy, di(lower alkyl)sulfamyl, cyano, trifluoromethylthio, lower alkyl sulfinyl, lower alkyl sulfonyl, benzylthio, lower alkylbenzylthio, lower alkoxybenzylthio, halogenobenzylthio, mercapto, nitro, amino, di(lower alkyl)amino, lower alkylamino, hydroxy, benzyloxy, lower alkylbenzyloxy, lower alkoxybenzyloxy, and halogenobenzyloxy in which the aroyl radical contains at least one of the above substituents; and
M is selected from the group consisting of OH, $NH_2$, lower alkylamino, di(lower alkyl)amino, glycosylamino, allylamino, phenethylamino, N-ethylphenethylamino, p-chloroanilino, 1-ethyl-2-aminomethyl piperidino, tetrahydrofurfurylamino, 1,2,5,6-tetrahydropyridino, morpholino, N-methyl piperazino, piperazino, N-phenylpiperazino, piperidino, ar-lower alkylamino, anilino, p-ethoxyanilino, cyclohexylamino, pyrrolidino, N-hydroxyethylpiperazino, N,N-dimethylcarboxamidomethylamino, N,N-diethylaminoethylamino, ar-methoxy, lower alkoxy, OZ (where Z is a cation) and OY, where Y represents the structure:

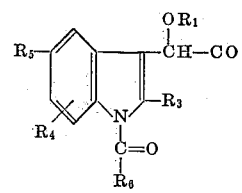

I have found that when an α-hydroxy, α-alkoxy, or α-acyloxy 3-indolyl acetic acid is substituted in the N-1 position by an aroyl group (such as p-chlorobenzoyl, p-methylthiobenzoyl) rather than a lower alkyl group and when the indole ring contains substituents, the N-1 aroyl compounds possess anti-inflammatory activity. These N-1 aroyl α-substituted 3-indolyl acetic acid compounds, in addition to possessing anti-inflammatory activity, exhibit antipyretic and analgesic action and also indicate value in the treatment of arthritic, dermatological disorders, and like conditions which are responsive to treatment with anti-inflammatory agents. For these purposes, the compounds of this invention are normally administered in tablets or capsules, the optimum dosage depending on the particular compound being used and the type and severity of infection being treated. Although the optimum quantities to be used will depend on the compounds employed and the particular type of disease treated, oral dose levels of preferred compounds in the range of 1–2,000 mg. per day are useful in the control of arthritic conditions, depending upon the activity of the particular compound and the reaction sensitivity of the patient.

It is an advantage of my invention that substitution on the N-1 position by an aroyl group as well as substitution on the $R_2$ and/or $R_5$ of the indole ring imparts anti-inflammatory activity to the previously inactive α-substituted 3-indole compound.

The substituted indoles of the formula:

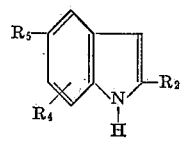

(wherein $R_2$, $R_4$, and $R_5$ have the previously defined meaning with the exception that each group must be compatible with the process in question if protection of the group cannot be obtained), are used to prepare the starting materials of this invention. These 1-unsubstituted indoles are readily prepared following the procedure set forth in columns 2 and 3 of U.S. Patent No. 2,825,734. Products where $R_5$ is halo, cyano, carboxy, and N,N-di(lower alkyl)carbamyl, lower alkyl, aryl, ar-lower alkyl, or nitro, are prepared via the synthesis beginning from a substituted 2-nitrobenzaldehyde or 2-nitrotoluene. The starting material (Flow Sheet I) for this invention is thus prepared by reacting the above-mentioned indole with oxalyl chloride. The acid chloride thus formed is treated with a lower alkyl alcohol, ar-lower alkyl alcohol, inorganic base, or disubstituted amine to produce the 1-unsubstituted 3-indolyl glyoxalate (or glyoxalamide) compounds. These glyoxalates (or glyoxalamides) are then acylated by reaction with an acid chloride or anhydride in the presence of a basic condensing agent to produce the starting material, namely, 1-acyl-3-indolyl glyoxalate (or glyoxalamide). Groups such as OH, $NH_2$, and NHR (containing an active hydrogen) will interfere with the α-alkylation and α-acylation. (Flow Sheet II, Step 2 or 3.) Therefore, when it is desired to prepare the novel compounds of this invention containing such α-substituents, reaction with the oxalyl halide compound (Flow Sheet I, Step 1) must be carried out with alcohols or secondary amines in order that there be no active hydrogen on the glyoxalic acid group. However, when it is desired to obtain the novel compounds with an α-hydroxy group (Flow Sheet II, Step 1), ammonia and primary amines as well as alcohols and secondary amines may be employed, since in this case the product is not going to be alkylated or acylated in the α-position and the presence of an active hydrogen is of no concern. Low yields of α-hydroxy amide and α-hydroxy monosubstituted amides will be obtained when N–1 acylation is carried out after formation of such amides. Therefore, it is preferred to carry out the N–1 acylation first when the α-hydroxy (amides and monosubstituted amides) are desired. Of course, it is to be understood that in the preparation of all the compounds of the invention, N–1 acylation may be carried out prior to the oxalyl halide step, and in many instances this procedure may be preferred.

The first group of compounds of this invention (Flow Sheet II), namely, the α-hydroxy 1-acyl 3-indolyl acetic acid compound, is prepared by reduction of the starting glyoxalate (or glyoxalamide) compound with a borohydride. The α-hydroxy compound thus produced may than be converted to the α-alkoxy compounds of this invention by alkylation of the said α-hydroxy compound using an aliphatic halide and silver oxide (Purdie method). Alternatively, the α-hydroxy compound may be converted to the α-acyloxy compounds, another group of novel compounds, by treating the α-hydroxy compound with an acid chloride or anhydride. Still another group of novel compounds, namely, the free acid compounds of the above-mentioned α-hydroxy, α-alkoxy, and α-acyloxy compounds, may be prepared by either pyrolysis of the corresponding t-lower alkyl ester or by reduction of the corresponding ar-methyl ester. The unsubstituted amides, monosubstituted amides, and non-toxic salts of these acids, which comprise a still further embodiment of this invention, may be prepared by any conventional means from the free acids. Finally, the anhydride of any of the above-mentioned novel acids may be prepared by reaction of the 1-acyl-substituted-3-indolyl-α-(alkoxy, acyloxy)-acetic acids with dicyclohexylcarbodiimide (or any other conventional method) to produce the corresponding anhydrides.

The synthesis of the various compounds of this invention having on the indole ring system a substituent which has a nitrogen attached to the homocyclic ring of the indole or to the acyl portion of the molecule is generally based on the corresponding nitro compound. This nitro group is transformed into the desired substituent. Such transformation is carried out before or after acylation of the 1-position, depending on the extent to which the desired substituent may interfere with the acylation, reduction, and/or alkylation. If such interference is possible, acylation, reduction, and/or alkylation should be carried out on the nitro indole and the nitro later transformed into the desired substituent. Such transformation can be carried out in a number of ways. Reduction of the nitro group gives an amino group. Reaction of the amino with alkyl halides gives mono and dialkyl amino groups. If the alkyl halide is a dihaloalkylene group (e.g., 1,4-dibromobutane), a heterocyclic ring (e.g., pyrrolidino) is formed. Similary, bis(β-chloroethyl)ether will give an N-morpholino compound. Alkylation can also be carried out simultaneously with reduction, as e.g., with formaldehyde and Raney nickel and hydrogen. Acylation can similarly be carried out on the amino compounds or on the nitro (with simultaneous reduction) to give acylamindo compounds. The amino group can be reacted with isocyanates to give ureido compounds. Free mercapto groups likewise will interfere with the acylation and should be formed after such a step or protected by conversion to an alkyl or aralkylthio group.

The novel compounds of this invention contain a substituent other than hydrogen at the $R_2$ and $R_5$ position as well as a substituted $R_6$. As indicated previously, these substitutions are necessary to impart a high degree of anti-inflammatory to the novel compounds. In the preferred compounds of this invention:

$R_1$ is lower alkyl (such as methyl, propyl, butyl, and the like), lower alkanoyl (such as acetyl, propanoyl and the like), or lower alkenyl (such as allyl and the like), however, more preferably alkanoyl, especially acetyl;

$R_2$ is a lower alkyl such as methyl, ethyl, butyl and the like, but especially methyl;

$R_4$ is lower alkoxy or hydrogen, especially hydrogen;

$R_5$ is lower alkyl (methyl, propyl, butyl, and the like), lower alkoxy (such as methoxy, ethoxy, butoxy, and the like), and di(lower alkyl)amino (such as dimethylamino, methylethylamino, dipropylamino, dibutylamino, and the like), but especially methyl, methoxy, and dimethylamino;

$R_6$ is a substituted phenyl (such as p-halophenyl, p-loweralkylthiophenyl, p-trifluoromethylphenyl, and the like), more preferably p-halophenyl and p-loweralkylthiophenyl, but especially p-chlorophenyl and p-methylthiophenyl; and M is hydroxy, lower alkoxy (such as methoxy, propoxy, butoxy, t-butoxy, and the like), or ar-methoxy (such as benzyl, diphenylmethyl, triphenylmethyl, and the like), but especially hydroxy.

The following compounds are indicative of the preferred compounds: (1 - p - chlorobenzoyl - 2 - methyl-5-methoxy - 3 - indolyl)-α-acetoxy acetic acid, (1-p-chlorobenzoyl-2-methyl-5-methoxy - 3 - indolyl) - α - methoxy acetic acid, (1-p-chlorobenzoyl - 2 - methyl - 5 - methoxy-3-indolyl)-α-allyloxy acetic acid, (1-p-methylthiobenzoyl-2-methyl - 5 - methoxy - 3 - indolyl)-α-methoxy acetic acid, (1-p-methylthiobenzoyl - 2 - methyl - 5 - methoxy-3-indolyl) - α - allyloxy acetic acid, (1-p-chlorobenzoyl-2-methyl - 5 - dimethylamino - 3 - indolyl)-α-methoxy acetic acid, (1-p-chlorobenzoyl - 2 - methyl-5-dimethylamino-3-indolyl) - α - allyloxy acetic acid, (1-p-chlorobenzoyl-2-methyl - 5 - dimethylamino - 3 - indolyl)-α-acetoxy acetic acid, (1-p-methylthiobenzoyl - 2 - methyl-5-dimethylamino - 3 - indolyl)-α-methoxy acetic acid, (1-p-methylthiobenzoyl-2-methyl - 5 - dimethylamino-3-indolyl) - α - allyloxy acetic acid, methyl-(1-p-chlorobenzoyl-2-methyl - 5 - methoxy - 3 - indolyl)-α-acetoxy acetate, methyl-(1-p-chlorobenzoyl - 2 - methyl - 5-methoxy-3-indolyl) - α - methoxy acetate, methyl-(1-p-chlorobenzoyl - 2 - methyl - 5 - methoxy-3-indolyl)-α-allyloxy acetate, methyl - (1-p-methylthiobenzoyl-2-methyl-5-methoxy - 3 - indolyl)-α-methoxy acetate, methyl-(1-p-methylthiobenzoyl-2-methyl - 5 - methoxy-3-indolyl)-α-allyloxy acetate, methyl - (1-p-chlorobenzoyl-2-methyl-5-dimethylamino - 3 - indolyl)-α-methoxy acetate, methyl- (1-p-chlorobenzoyl - 2 - methyl - 5 - dimethylamino-3-indolyl)-α-allyloxy acetate, methyl-(1-p-chlorobenzoyl-2-methyl-5-dimethylamino-3-indolyl) - α - acetoxy acetate, methyl-(1-p-methylthiobenzoyl - 2 - methyl - 5 - dimethylamino-3-indolyl)-α-methoxy acetate, methyl-(1-p-methyl-thiobenzoyl-2-methyl - 5 - dimethylamino - 3 - indolyl)-α-allyloxy acetate, methyl-(1-p-chlorobenzoyl - 5 - methyl-3-indolyl)-α-methoxy acetate, and methyl-(1-p-chlorobenzoyl-5-fluoro-3-indolyl)-α-methoxy acetate.

FLOW SHEET I

*Preparation of the starting material*

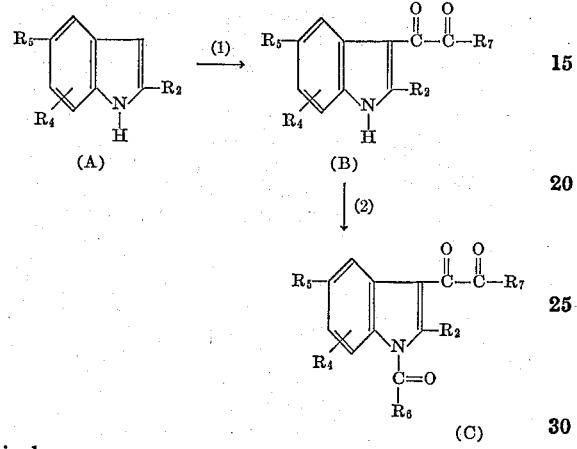

Equivalents:
  $R_2$, $R_4$, $R_5$ and $R_6$ are as previously defined with those groups excepted which will be effected by the process in question;
  $R_7$ is lower alkoxy (methoxy, ethoxy, t-butoxy), ar-methoxy (benzyloxy, diphenylmethoxy), di-lower alkyl substituted amino, or other disubstituted amino groups, when it is desired to obtain the α-alkylated or α-acylated compounds.

Reactions and conditions:

(1) Reaction with oxalyl chloride at low temperatures in an insert solvent such as benzene, toluene, ether, chloroform, and the like to produce the indolyl glyoxalyl chloride compound and reaction of this compound with a lower alkanol, ar-methanol, a di-lower alkylamine, or other di-substituted amine until the reaction is substantially complete.

(2) Reaction with a compound such as a mixed anhydride of an aromatic acid and a strong inorganic acid or a mixed anhydride of an aromatic acid and an organic acid in the presence of a base at ambient temperatures in a solvent such as dimethylformamide until the reaction is substantially complete.

FLOW SHEET II

*Preparation of the compounds of this invention*

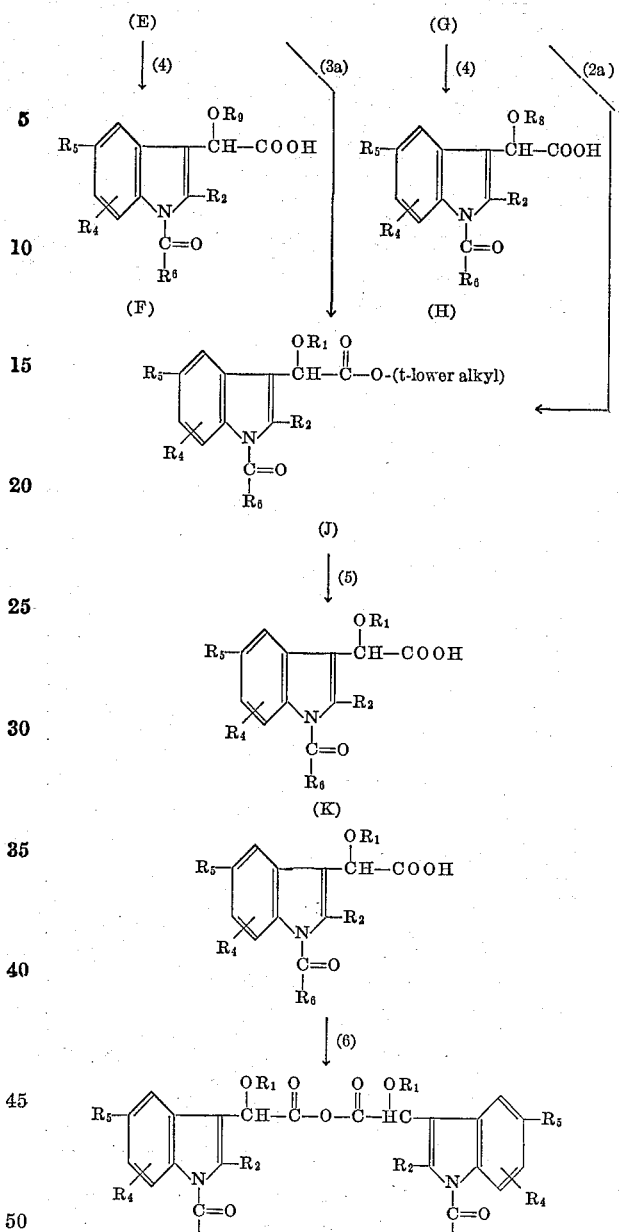

Equivalents:
  $R_1$ is as previously defined;
  $R_2$, $R_4$, $R_5$, $R_6$ and $R_7$ are as previously defined with those groups excepted which will be effected by the process in question;
  $R_8$ is a lower alkanoyl, lower alkenoyl, lower alkynoyl, aroyl, ar-lower alkanoyl, and halo lower alkanoyl;
  $R_9$ is lower alkyl, lower alkenyl, lower alkynyl, ar-lower alkyl, halo lower alkyl, and dihalo lower alkyl.

Reactions and conditions:

(1) Reaction with a borohydride in an inert solvent until the reaction is substantially complete. The solvent may be lower alkanols (methanol, propanol, iso-propanol, butanol, and the like), water, dimethylformamide, dimethoxyethane, tetrahydrofuran, and mixed solvents (methanol-dimethoxyethane, and the like) and the like. Lower alcohols and mixed solvents are preferred, especially methanol and methanol-dimethoxyethane. The alkali borohydrides may be sodium borohydride, potassium borohydride, lithium borohydride, and the like, preferably sodium borohydride. Any suitable temperature may be used (−15° to 45° C.), preferably 0° C. to 35° C., but especially ambient temperatures.

(2) Reaction with an acid halide or anhydride until the reaction is substantially complete. The acid halide or anhydride may be derived from a lower alkanoic acid (acetic, propionic, butyric, and the like), lower alkenoic acid (ethenoic, propenoic, butenoic, and the like), lower alkynoic acid (propynoic, butynoic, and the like), aromatic acids (benzoic, naphthanoic and substituted benzoic and naphthanoic and the like), ar-lower alkanoic acid (phenylacetic, phenylpropionic, and the like), and halo lower alkanoic acid (bromoacetic, 2,2-dichloroacetic, 3-chloropropionic, 2,3 - chlorobromopropionic and the like); lower alkanoic acid anhydrides are preferred, especially acetic anhydride. The reaction can be run without a solvent; however, a solvent such as pyridine, benzene, ether, and other non-hydroxylic solvents is preferred, especially pyridine or benzene. The reaction may be carried out at any suitable temperature (10° to 100° C.), preferably 0° to 35° C., but especially at ambient temperatures.

(2a) E is J when $R_7$ is t-lower alkyl.

(3) Reaction with an organic halide in the presence of silver oxide, until the reaction is complete. The halide may be lower alkyl halide (ethyl, propyl, butyl, and the like), halo lower alkyl halide (chloroethyl, fluoropropyl, difluoropropyl, and the like), ar-lower alkyl halide (benzyl, phenylethyl, and the like), lower alkenyl halide (propylen, butylen, and the like), and lower alkynyl halide (propynyl, butynyl, and the like). Any suitable temperature may be used (0° to reflux), preferably 0° to 45° C., but especially ambient temperatures. When the solvent from Reaction 1 is an alcohol, it is highly preferred to first remove this solvent before continuing to Reaction 3. The preferred halides are lower alkyl halides and lower alkenyl halides, especially methyliodide and allylbromide.

(3a) G is J when $R_7$ is t-lower alkyl.

(4) Reduction with hydrogen in an inert solvent under pressure in the presence of a hydrogenation catalyst until the stoichiometric amount of hydrogen is absorbed. The solvent may be water or a mixture of water and a lower alkanol (methanol, propanol, and the like). The reaction may be run under any suitable pressure (10–100 lbs.), preferably 25–50 lbs., but especially 35–45 lbs., in the presence of a catalyst (palladium, platinum, and the like), preferably 5–15% palladium on carbon at any suitable temperature (0–80° C.), preferably below 60° C., but especially ambient temperatures until the reaction is substantially complete. (This step is carried out when $R_8$ is ar-methoxy.)

(5) Pyrolysis by heating until the lower alkene begins to evolve and maintaining the temperature of evolution until pyrolysis is complete. It is preferred to use the t-butyl ester for pyrolysis, heating this compound under nitrogen in the presence of porous glass chips (or in the presence of a catalytic amount of a strong acid) until the isobutylene is substantially evolved.

(6) Reaction with a disubstituted carbodiimide (0.5 mole dicyclohexylcarbodiimide preferred) in a solvent [tetrahydrofuran, (THF) 1,2-dimethoxyethane, dimethylformamide or ethyl acetate—preferably THF] at any suitable temperature (0° to 100° C.), preferably 0° to 50° C., but especially ambient temperatures until the reaction is substantially complete.

In Reaction 1 (Flow Sheet II), the reaction ratio is 0.25 moles of borohydride per mole of indole compound. Using less than 0.25 moles will result in a lower yield. It is preferred to use a slight excess (0.27–0.30). The reaction may be run without using a buffer; however, it is preferred to buffer the solution at a pH of 5–10, but especially 7–9. The pH may be maintained during the reaction by adding the required amount of an acid (dilute hydrochloric acid, sulfuric acid, acetic acid, and the like) or preferably by the continuous addition of carbon dioxide. When the pH of the solution is allowed to go below pH 5, the yield of the reaction product will be accordingly reduced. In those cases where the reactant is not appreciably soluble in the solvent, it is preferred to choose a mixed solvent which will increase the solubility of the reactant. Although the above-mentioned reduction method is preferred, other reduction methods may be employed, such as hydrogen in the presence of a palladium or platinum catalyst or aluminum amalgam or zinc amalgam suspended in moist ether. The reaction time is not critical, lower temperatures requiring longer times to obtain the same yields. Using the preferred temperatures, reaction times of 30 minutes to 2 hours may be used.

In Reaction 2 (Flow Sheet II), a slight excess of the acid halide or anhydride is used (1.1–1.5 moles). The molar ratio is not critical in this reaction; the only disadvantage in using less than a molar equivalent of the acylating agent is a reduction in yield. The reaction time depends upon the temperature used, longer reaction time being required when lower temperatures are used. When temperatures in the neighborhood of 0° C. are used, up to 18 hours may be required. When the preferred temperature is used (ambient temperatures), usually 2 hours will be sufficient. It is generally preferred to avoid high temperatures and/or strongly acid conditions so as to prevent decomposition of the α-position back to the hydroxy group. In those cases where the substituent on the indole molecule will be effected by the acylation (such as OH, $NH_2$, or NHR), the corresponding benzyloxy or nitro group is used. After acylation of the α-position is accomplished, the banzyloxy and/or nitro group may be reduced to the hydroxy and/or amino group respectively. The amino group may then be further converted to the final mono- or disubstituted amino group by known methods.

In Reaction 3 (Flow Sheet II), long reaction times and/or high temperatures will cause the yield to drop drastically and a point can be reached where no product will be obtained. Therefore, if reflux temperatures are used, the reaction time must be shortened considerably. When ambient temperatures are used, the reaction may be carried out from 1–4 hours. The molar ratios of reactants are not critical; however, when using less than the theoretical amount of silver oxide and/or aliphatic halide, the yield will be decreased. As in Reaction 2, OH, $NH_2$, and NHR as well as $NR_2$ groups on the indole ring must be avoided. These groups, when desired, may be placed on the ring as indicated in the discussion of Reaction 2.

Reaction 5 may be carried out at temperatures between 150° to 250° C.; however, it is preferred to use a catalyst such as an acid, glass chips, or porous plate chips (preferably the latter) so that pyrolysis may be effectively carried out at lower temperatures.

In Reaction 6, only those indole acids are employed which do not contain a OH, $NH_2$, NHR, and/or $CO_2H$ group on any position.

The α-hydroxy free acid compounds of this invention are thermally unstable. Therefore, when Reaction 5 or 6 is to be carried out on compounds containing the α-hydroxy, the stable salts thereof should be made first. (The α-hydroxy acid salts may be obtained by reduction of the corresponding oxalyl salt

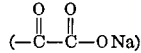

with a borohydride at ambient temperatures.) However, the free acid compound may be held as such for considerable periods if they are maintained at low temperatures.

The following examples are given by way of illustration:

EXAMPLE 1

*Benzyl-2-methyl-5-methoxy-3-indolylglyoxyalate*

To a stirred solution of 0.005 mole of oxalyl chloride in 15 ml. of anhydrous ether is added a solution of 0.005 of a mole of 2-methyl-5-methoxy-indole in 15 ml. of ether over a period of approximately 30 minutes. The mixture is then stirred several hours under a blanket of nitrogen. The mixture is concentrated to approximately ½ the volume, 6 ml. of benzyl alcohol is added, and the mixture is stirred for several hours. After removal of the ether and excess benzyl alcohol, the residue is chromatographed on a 100 gm. silica gel column using ether-petroleum ether (v./v. 10–100%) as eluent to give benzyl-2-methyl-5-methoxy-3-indolylglyoxalate.

Similarly, when the above procedure is followed using dimethylamine, diethylamine, methylethylamine, methylbutylamine, dibutylamine, glycosamine, N-ethylphenethylamine, tetrahydrofurfurylamine, 1,2,5,6-tetrahydropyridine, morpholine, N-methylpiperazine, piperazine, N-phenylpiperazine, piperidine, cyclohexylamine, pyrrolidine, diphenylmethanol, methanol, propanol, t-butanol, ethanol, sodium carbonate, potassium carbonate, and calcium carbonate in place of benzyl alcohol in the above example, there is obtained 2-methyl-5-methoxy-3-indolyl glyoxal dimethylamide,
2-methyl-5-methoxy-3-indolyl glyoxal diethylamide,
2-methyl-5-methoxy-3-indolyl glyoxal methylethylamide,
2-methyl-5-methoxy-3-indolyl glyoxal methylbutylamide,
2-methyl-5-methoxy-3-indolyl glyoxal dibutylamide,
2-methyl-5-methoxy-3-indolyl glyoxal glycosylamide,
2-methyl-5-methoxy-3-indolyl glyoxal-N-ethylphenethylamide,
2-methyl-5-methoxy-3-indolyl glyoxal tetrahydrofurfurylamide,
2-methyl-5-methoxy-3-indolyl glyoxal 1,2,5,6-tetrahydropyridinamide,
2-methyl-5-methoxy-3-indolyl glyoxal morpholinamide,
2-methyl-5-methoxy-3-indolyl glyoxal N-methylpiperazinamide,
2-methyl-5-methoxy-3-indolyl glyoxal piperaminamide,
2-methyl-5-methoxy-3-indolyl glyoxal N-phenylpiperazinamide,
2-methyl-5-methoxy-3-indolyl glyoxal piperidinamide,
2-methyl-5-methoxy-3-indolyl glyoxal cyclohexylamide,
2-methyl-5-methoxy-3-indolyl glyoxal pyrrolidinamide,
diphenylmethyl 2-methyl-5-methoxy-3-indolyl glyoxalate,
methyl 2-methyl-5-methoxy-3-indolyl glyoxalate,
propyl 2-methyl-5-methoxy-3-indolyl glyoxalate,
t-butyl 2-methyl-5-methoxy-3-indolyl glyoxalate,
ethyl 2-methyl-5-methoxy-3-indolyl glyoxalate,
sodium 2-methyl-5-methoxy-3-indolyl glyoxalate,
potassium 2-methyl-5-methoxy-3-indolyl glyoxalate,
and calcium 2-methyl-5-methoxy-3-indolyl glyoxalate.

EXAMPLE 2

The procedure of Example 1 is employed using 4-methyl-5-methyl indole,
2-methyl-4-methyl indole,
2-methyl-5-methyl indole,
2-allyl-4-methyl-5-methyl indole,
2-methyl-4-propyl-5-propyl indole,
2-pentyl-5-methyl indole,
2-methyl-4-methoxy-5-methoxy indole,
2-methyl-4-propoxy-5-methoxy indole,
2-methyl-5-pentoxy indole,
2-methyl-4-fluoro-5-methoxy indole,
2-methyl-4-trifluoromethyl-5-methoxy indole,
2-methyl-5-nitro indole,
2-methyl-5-bis(benzyloxyethyl)amino indole,
2-methyl-5-bis-(benzyloxybutyl)amino indole,
2-methyl-5-bis(benzyloxypentyl)amino indole,
2-methyl-5-(1-pyrrolidino) indole,
2-methyl-5(4-methyl-1-piperazinyl) indole,
2-methyl-5-(4-morpholinyl) indole,
2-methyl-5-trifluoromethyl indole,
2-methyl-5-chloro indole,
2-methyl-5-bromo indole,
2-methyl-5-fluoro indole,
2-methyl-5-dimethylsulfamyl indole,
2-methyl-5-dipropylsulfamyl indole,
2-methyl-5-benzylthio indole,
2-methyl-5-p-methylbenzylthio indole,
2-methyl-5-p-propylbenzylthio indole,
2-methyl-5-p-methoxybenzylthio indole,
2-methyl-5-p-propoxybenzylthio indole,
2-methyl-5-p-chlorobenzylthio indole,
2-methyl-5-p-bromobenzylthio indole,
2-methyl-5-p-fluorobenzylthio indole,
2-methyl-5-cyclobutylmethyloxy-3-indolyl glyoxalate,
2-methyl-5-cyclopropylmethyloxy-3-indolyl glyoxalate,
2-methyl-5-N,N-dimethylcarbamyl indole,
2-methyl-5-dimethylamino indole,
2-methyl-5-dipropylamino indole,
2-methyl-5-dipentylamino indole,
2-methyl-5-benzyloxy indole,
2-methyl-5-diethylamino indole,
2-methyl-5-methylbenzyloxy indole,
2-methyl-5-ethoxybenzyloxy indole,
2-methyl-5-cyano indole,
2-methyl-5-p-chlorobenzyloxy indole,
2-methyl-5-allyl indole, and
2-methyl-5-allyloxy indole in place of 2-methyl-5-methoxy indole. There are obtained benzyl-4-methyl-5-methyl-3-indolylglyoxalate,
benzyl-2-methyl-4-methyl-3-indolylglyoxalate,
benzyl-2-methyl-5-methyl-3-indolylglyoxalate,
benzyl-2-allyl-4-methyl-5-methyl-3-indolylglyoxalate,
benzyl-2-methyl-5-propyl-3-indolylglyoxalate,
benzyl-2-pentyl-5-methyl-3-indolylglyoxalate,
benzyl-2-methyl-4-methoxy-5-methoxy-3-indolylglyoxalate,
benzyl-2-methyl-4-propoxy-5-methoxy-3-indolylglyoxalate,
benzyl-2-methyl-5-pentoxy-3-indolylglyoxalate,
benzyl-2-methyl-4-fluoro-methoxy-3-indolylglyoxalate,
benzyl-2-methyl-4-trifluoromethyl-5-methoxy3-indolylglyoxalate,
benzyl-2-methyl-5-nitro-3-indolylglyoxalate,
benzyl-2-methyl-5-bis(benzyloxyethyl)amino-3-indolylglyoxalate,
benzyl-2-methyl-5-bis(benzyloxybutyl)amino-3-indolylglyoxalate,
benzyl-2-methyl-5-bis(benzyloxypentyl)amino-3-indolylglyoxalate,
benzyl-2-methyl-5-(1-pyrrolidino)-3-indolylglyoxalate,
benzyl-2-methyl-5-(4-methyl-1-piperazinyl)-3-indolylglyoxalate,
benzyl-2-methyl-5-(4-morpholinyl)-3-indolylglyoxalate,
benzyl-2-methyl-5-trifluoromethyl-3-indolylglyoxalate,
benzyl-2-methyl-5-chloro-3-indolylglyoxalate,
benzyl-2-methyl-5-bromo-3-indolylglyoxalate,
benzyl-2-methyl-5-fluoro-3-indolylglyoxalate,
benzyl-2-methyl-5-dimethylsulfamyl-3-indolylglyoxalate,
benzyl-2-methyl-5-dipropylsulfamyl-3-indolylglyoxalate,
benzyl-2-methyl-5-benzylthio-3-indolylglyoxalate,
benzyl-2-methyl-5-p-methylbenzylthio-3-indolylglyoxalate,
5-p-methoxybenzylthio-3-indolylglyoxalate,
benzyl-2-methyl-5-p-propoxybenzylthio-3-indolylglyoxalate,
benzyl-2-methyl-5-p-chlorobenzylthio-3-indolylglyoxalate,
benzyl-2-methyl-5-p-bromobenzylthio-3-ndolylglyoxalate,
benzyl-2-methyl-5-p-fluorobenzylthio-3-indolyglyoxalate,
benzyl-2-methyl-5-cyclobutylmethyloxy-3-indolylglyoxalate,
benzyl-2-methyl-5-cyclopropylmethyloxy-3-indolylglyoxalate,
benzyl-2-methyl-5-N,N-dimethylcarbamyl-3-indolylglyoxalate,
benzyl-2-methyl-5-dimethylamino-3-indolyglyoxalate,
benzyl-2-methyl-5-dipropylamino-3-indolylglyoxalate,
benzyl-2-methyl-5-dipentylamino-3-indolylglyoxalate,
benzyl-2-methyl-5-benzyloxy-3-indolylglyoxalate, benzyl-2-methyl-5-diethylamino-3-indolylglylglyoxalate, benzyl-2-methyl-5-methylbenzyloxy-3-indolylglyoxalate, benzyl-2-methyl-5-ethoxybenzyloxy-3-indolylglyoxalate, benzyl-2-methyl-5-cyano-3-indolylglyoxalate, benzyl-2-methyl-5-p-chlorobenzyloxy-3-indolylglyoxalate, benzyl-2-methyl-5-allyl-3-indolylglyoxalate, and benzyl-2-methyl-5-allyloxy-3 - indolylglyoxalate, respectively.

EXAMPLE 3

*Benzyl-(1-p-methylthiobenzoyl-2-methyl-5-methoxy-3-indolyl)-glyoxalate*

A solution of (0.021 mole) of benzyl-α-(2-methyl-5-methoxy-3-indolyl)-glyoxalate in 20 ml. of dimethylformamide is added dropwise to a cold suspension of 1.0 g. (0.022 mole) of sodium hydride (52% dispersion in mineral oil) and 25 ml. of dimethylformamide. The mixture is stirred at room temperature for 20 minutes, cooled and treated with (0.0222 mole) of p-methylthiobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to give benzyl-α-(1 -p-methylthiobenzoyl-2-methyl-5-methoxy-3-indolyl)-glyoxalate.

Similarly, when using 3,4,5-trimethoxybenzoyl chloride, p-N,N-dimethylsulfamylbenzoyl chloride, p-trifluoromethylthiobenzoyl chloride, N,N-dimethyl-p-sulfonamidobenzoyl chloride, p - methylsulfinylbenzoyl chloride, p-methylsulfonylbenzoyl chloride, p-chlorobenzoyl chloride, p-4'-methylbenzylthiobenzoic acid, p-4'-methoxybenzylthiobenzoic acid, p-4'-chlorobenzylthiobenzoic acid, p - mercaptobenzoyl chloride, p - dimethylaminobenzoyl chloride, p-acetaminobenzoyl chloride, o-fluoro-p-chlorobenzoyl chloride, o-methoxy-p-chlorobenzoyl chloride, 2,4,5-trichlorobenzoyl chloride, p-methylbenzoyl chloride, o-propylbenzoyl chloride, p-trifluoromethylbenzoyl chloride, p-phenoxybenzoyl chloride, p-4'-methylphenoxybenzoyl chloride, p-4'-chlorophenoxybenzoyl chloride, o-cyanobenzoyl chloride, p-nitrobenzoyl chloride, p-benzyloxybenzoyl chloride, and o-benzyloxybenzoyl chloride in place of p-methylthiobenzoyl chloride, there are obtained benzyl-1,3,4,5-trimethoxybenzoyl-2-methyl-5-methoxy - 3 - indolylglyoxalate, benzyl-1-p-N,N-dimethylsulfamylbenzoyl - 2 - methyl-5-methoxy-3-indolylglyoxalate, benzyl - 1 - p-trifluoromethylthiobenzoyl-2-methyl-5-methoxy-3-indolylglyoxalate, benzyl-1-N,N-dimethyl-p-sulfonamidobenzoyl - 2 - methyl-5-methoxy-3-indolylglyoxalate, benzyl-1-p-methylsulfinylbenzoyl-2-methyl - 5 - methoxy-3-indolylglyoxalate, benzyl-1-p-methylsulfonylbenzoyl-2-methyl-5-methoxy-3-indolylglyoxalate, benzyl-1-p-chlorobenzoyl-2-methyl-5-methoxy-3 - indolylglyoxalate, benzyl-1-p-4'-methylbenzylthiobenzyl-2-methyl - 5 - methoxy-3-indolylglyoxalate, benzyl-1-p-4'-methoxybenzylthiobenzyl-2-methyl-5-methoxy-3-indolylglyoxalate, benzyl-1-chlorobenzylthiobenzyl-2-methyl-5-methoxy-3-indolylglyoxalate, benzyl-1-p-mercaptobenzoyl-2-methyl - 5 - methoxy-3-indolylglyoxalate, benzyl - 1 - p - dimethylaminobenzoyl-2-methyl - 5 - methoxy-3-indolylglyoxalate, benzyl-1-p-acetaminobenzoyl - 2 - methyl-5-methoxy-3-indolylglyoxalate, benzyl-1-o-fluoro-p-chlorobenzoyl - 2 - methyl-5-methoxy-3-indolylglyoxalate, benzyl-1-o-methoxy-p-chlorobenzoyl-2 - methyl-5-methoxy-3-indolylglyoxalate, benzyl-1,2,4,5-trichlorobenzoyl - 2 - methyl-5-methoxy-3-indolylglyoxalate, benzyl-1-p-methylbenzoyl-2-methyl-5-methoxy-3-indolylglyoxalate, benzyl-1-o-propylbenzoyl - 2 - methyl-5-methoxy-3-indolylglyoxalate, benzyl-1-p-trifluoromethylbenzoyl-2-methyl-5-methoxy-3-indolylglyoxalate, benzyl-1-p-phenoxybenzoyl-2-methyl - 5 - methoxy-3-indolylglyoxalate, benzyl-1-p-4'-methylphenoxybenzoyl-2-methyl-5-methoxy - 3 - indolylglyoxalate, benzyl-1-p-4'-chlorophenoxybenzoyl - 2 - methyl - 5 - methoxy-3-indolylglyoxalate, benzyl-1-o-cyanobenzoyl - 2 - methyl-5-methoxy-3-indolylglyoxalate, benzyl-1-nitrobenzoyl-2-methyl-5-methoxy-3-indolylglyoxalate, benzyl-1-p-benzyloxybenzoyl-2-methyl-5-methoxy-3-indolylglyoxalate, and benzyl-1-o-benzyloxybenzoyl-2-methyl-5-methoxy-3-indolylglyoxalate, respectively.

EXAMPLE 4

The procedure of Example 3 is employed using the benzyl substituted-3-indolylglyoxalates of Example 2 in place of benzyl-2-methyl-5-methoxy-3-indolylglyoxalate; there are obtained the corresponding benzyl-1-p-methylthiobenzoyl-substituted-3-indolylglyoxalates.

Similarly, when the procedure of Example 3 is employed using the 2-methyl-5-methoxy-3-indolylglyoxal disubstituted amides, esters, and salts obtained from Example 1 in place of benzyl-2-methyl-5-methoxy-3-indolylglyoxalate, there are obtained the corresponding 1-p-methylthiobenzoyl - 2 - methyl-5-methoxy-3-indolylglyoxal disubstituted amides, esters, and salts.

EXAMPLE 5

*Benzyl-(1-p-methylthiobenzoyl-2-methyl-5-methoxy-3-indolyl)-α-hydroxy acetate*

A solution of 0.003 mole of benzyl-(1-p-methylthiobenzoyl-2-methyl-5-methoxy-3-indolyl)-glyoxalate and 50 cc. of methanol is cooled in an ice bath for 15 minutes and $CO_2$ is bubbled through. The solution is removed from the ice bath and to it is added a solution of 0.15 gram of sodium borohydride in 30 ml. of dimethoxyethane and 30 ml. of methanol. The reaction mixture is stirred for one hour and carbon dioxide is continually bubbled through during that time. The solution is then filtered. The filtrate is then poured into a mixture of 250 ml. of ice water and 2 ml. of acetic acid. The filtrate is extracted with (2×150 ml.) of ether. The ether extract is subsequently washed with (2×100 ml.) of water, (2×50 ml.) of saturated sodium bicarbonate, and (2×100 ml.) of water. The ether extract is then dried over sodium sulfate and concentrated to a heavy syrup. The concentrate is then chromatographed on a silica gel column using 25% ether-petroleum ether. The product obtained after crystallization is benzyl-(1-p-methylthiobenzoyl - 2 - methyl-5-methoxy-3-indolyl)-α-hydroxy acetate, M.P. 109–111° C.

Similarly, the above procedure is followed using the benzyl-(1-p-methylthiobenzoyl-substituted - 3 - indolyl)-glyoxalates, (1-p-methylthiobenzoyl-2-methyl-5-methoxy-3-indolyl)-glyoxal disubstituted amides, (1-p-methylthiobenzoyl - 2 - methyl-5-methoxy-3-indolyl)-glyoxale esters, (1-p-methylthiobenzoyl - 2 - methyl-5-methoxy-3-indolyl)-glyoxal salts, and benzyl-(1-aroyl-2-methyl-5-methoxy-3-indolyl)-glyoxalates obtained from Examples 3 and 4 in place of benzyl-(1-p-methylthiobenzoyl-2-methyl-5-methoxy-3-indolyl)-glyoxalate in the above example, there are obtained the corresponding benzyl-(1-p-methylthiobenzoyl-substituted-3-indolyl)-α-hydroxy acetates, (1-p-methylthiobenzoyl - 2 - methyl-5-methoxy-3-indolyl)-α-hydroxy disubstituted acetamides, (1-p-methylthiobenzoyl-2-methyl-5-methoxy-3-indolyl)-α-hydroxy acetates, (1-p-methylthiobenzoyl - 2 - methyl-5-methoxy-3-indolyl)-α-hydroxy acetic acid salts, and benzyl-(1-aroyl-2-methyl-5-methoxy-3-indolyl)-α-hydroxy acetates, respectively.

EXAMPLE 6

*Benzyl-(1-p-methylthiobenzoyl-2-methyl-5-methoxy-3-indolyl)-α-acetoxy acetate*

A solution of 4.0 grams of benzyl-(1-p-methylthiobenzoyl - 2 - methyl-5-methoxy-3-indolyl)-α-hydroxy acetate, 3.3 grams of acetic anhydride, and 50 ml. of pyridine is maintained at 0–5° for 15 hours. The mixture is then poured into 500 ml. of ice water and extracted with (2×350 ml.) of ether. The ether extract is washed with water and dried over sodium sulfate. The filtrate is then evaporated to a syrup. The crude product is then chromatographed on a silica gel column using 10–20% ether-petroleum ether to yield benzyl-(1-p-methylthiobenzoyl-2-methyl-5-methoxy-3-indolyl)-α-acetoxy acetate.

When propanoic anhydride, butanoic anhydride, propenoic anhydride, 2-butenoic anhydride, propynoic anhydride, 2-butynoic anhydride, benzoic anhydride, phenylacetic anhydride, 1-bromoacetic anhydride, 1,1-dichloroacetic anhydride, 2-chloropropionic anhydride, and 1,2-chlorobromopropionic anhydride are used in the above example in place of acetic anhydride, there are obtained the corresponding benzyl-(1-p-methylthiobenzoyl-2-methyl-5-methoxy-3-indolyl)-α-acyloxy acetates.

Similarly, when the benzyl-(1-p-methylthiobenzoyl-substituted-3-indolyl)-α-hydroxy acetates, benzyl-(1-p-methylthiobenzoyl-2-methyl-5-methoxy-3-indolyl)-α-hydroxy-[acetates, disubstituted amides or salts], or benzyl-(1-aroyl-2-methyl-5-methoxy-3-indolyl)-α-hydroxy acetates obtained from Example 5 are used in place of benzyl-(1-p-methylthiobenzoyl-2-methyl-5-methoxy-3-indolyl)-α-hydroxy acetate in the above example, there are obtained the corresponding α-acetoxy compounds.

EXAMPLE 7

*Benzyl-(1-p-methylthiobenzoyl-2-methyl-5-methoxy-3-indolyl)-α-methoxy acetate*

To a solution of 15 grams of benzyl-(1-p-methylthiobenzoyl-2-methyl-5-methoxy-3-indolyl)-α-hydroxy acetate in 45 ml. of methyl iodide is added 20 grams of silver oxide, and the reaction mixture is stirred for 3 hours at room temperatrue. The mixture is then diluted with ether, filtered, and the filtrate concentrated in vacuo. The residue is then chromatographed on a silica gel column using 10–20% ether-petroleum ether as eluent to yield benzyl-(1-p-methylthiobenzoyl-2-methyl-5-methoxy-3-indolyl)-α-methoxy acetate. (The silver oxide used is prepared by dissolving 8 grams of sodium hydroxide in 200 ml. of methanol and adding this solution to 36 grams of silver nitrate and 50 ml. of water. The mixture is filtered, washed with 2×25 ml. of methanol followed by 2×25 ml. of ether and then dried. The cake is pulverized to a fine mesh and stored in a dark bottle).

When the above procedure is followed using ethyl iodide, butyl iodide, 1,2-chloroiodoethane, 1-iodo-3-chloropropane, propyl-2-en bromide, butyl-2-en bromide, propyl-2-yn bromide, butyl-2-yn bromide, benzyl bromide, and phenylethyl bromide in place of methyl iodide in the above example, there are obtained the corresponding benzyl - (1 - p - methylthiobenzoyl - 2 - methyl - 5 - methoxy-3-indolyl)-α-alkylated acetates.

Similarly, when the above procedure is followed using the benzyl-(1-p-methylthiobenzoyl-substituted-3-indolyl)-α-hydroxy acetates, benzyl - (1-p-methylthiobenzoyl-2-methyl-5-methoxy-3-indolyl)-α-hydroxy-[acetates, disubstiuted amides or salts], or benzyl-(1-aroyl-2-methyl-5-methoxy-3-indolyl)-α-hydroxy acetates obtained from Example 5 in place of benzyl-(1-p-methylthiobenzoyl-2-methyl-5-methoxy-3-indolyl)-α-hydroxy acetate in the above example, there are obtained the corresponding α-methoxy compounds.

EXAMPLE 8

*(1-p-methylthiobenzoyl-2-methyl-5-methoxy-3-indolyl)-α-acetoxy acetic acid·HCl*

A mixture of 0.05 moles of benzyl-(1-p-methylthiobenzoyl-2-methyl-5-methoxy-3-indolyl)-α-acetoxy acetate in 200 ml. of ethanol is reduced with 10% palladium on carbon under 40 lbs. of hydrogen at room temperature until the stoichiometric amount of hydrogen is absorbed. The mixture is filtered, 50 ml. of 2.5 N hydrochloric acid is added, and the mixture is then concentrated in vacuo to a residue and triturated with ether. The crude (1-p-methylthiobenzoyl-2-methyl-5-methoxy-5-methoxy-3-indolyl)-α-acetoxy acetic acid hydrochloride is recrystallized from ether-ethanol.

When the above procedure is followed using the benzyl esters and other ar-methyl esters obtained from Example 7 in place of the benzyl-(1-p-methylthiobenzoyl-2-methyl-5-methoxy-3-indolyl)-α-acetoxy acetate in the above example, there are obtained the corresponding free acids.

EXAMPLE 9

*(1-p-methylthiobenzoyl-2-methyl-5-methoxy-3-indolyl)-α-acetoxy acetic acid*

A mixture of 0.005 mole of t-butyl-(1-p-methylthiobenzoyl-2-methyl-5-methoxy-3-indolyl)-α-acetoxy acetate and approximately 1 gram of fine porous plate chips in an atmosphere of nitrogen is heated slowly in an oil bath until isobutylene begins to escape. Stirring is initiated and the temperature is held constant for approximately one hour. On cooling, a residue is extracted with a saturated sodium bicarbonate solution. The aqueous bicarbonate extract is filtered, washed with 100 ml. of ether, made neutral with 1–N hydrochloric acid and lyophilized to give (1-p-methylthiobenzoyl-2-methyl-5-methoxy-3-indolyl)-α-acetoxy acetic acid.

Similarly, the above procedure is followed using the t-lower alkyl esters indicated in the previous examples to yield those corresponding free acids.

EXAMPLE 10

*(1-p-methylthiobenzoyl-2-methyl-5-methoxy-3-indolyl)-α-acetoxy acetic anhydride*

Dicyclohexylcarbodiimide (0.049 mole) is dissolved in a solution of (1-p-methylthiobenzoyl-2-methyl-5-acetoxy-3-indolyl)-α-acetoxy acetic acid (0.10 mole) and 200 ml. of tetrahydrofuran and the solution is allowed to stand at room temperature for 2 hours. The precipitated urea is removed by filtration and the filtrate is evaporated in vacuo to a residue and flushed with Skellysolve B.

Similarly, when any of the other free indolyl acids (not containing an active hydrogen group) herein described are used in the above procedure, the corresponding anhydride is obtained.

EXAMPLE 11

*Benzyl-(1-p-methylthiobenzoyl-2-methyl-5-amino-3-indolyl)-α-acetoxy acetate*

To a solution of 0.01 mole of benzyl-(1-p-methylthiobenzoyl-2-methyl-5-nitro-3-indolyl)-α-acetoxy acetate in 50 ml. of ethanol is added 0.01 mole of 38% hydrochloric acid and the mixture reduced under 40 pounds of hydrogen at room temperature in the presence of Raney nickel. The mixture is then filtered and 50 ml. of 2.5 N hydrochloric acid is added to the filtrate. The aqueous phase is washed with 2×50 ml. of chloroform, cooled, made slightly alkaline with concentrated ammonium hydroxide and extracted with 3×50 ml. of chloroform. The chloroform extracts are combined, washed with 2×100 ml. of water, dried over anhydrous potassium carbonate, filtered, and the solvent removed in vacuo and the residue chromatographed on a 100 gram alumina column with an ethyl acetate ether (v./v. 10–100%) solvent system to yield benzyl-(1-p-methylthiobenzoyl-2-methyl-5-amino-3-indolyl)-α-acetoxy acetate.

Similarly, when any of the benzyl-(1-aroyl-nitro-substituted-3-indolyl)-α-acyloxy (or alkoxy) acetates obtained from Examples 6 and 7 respectively are used in place of benzyl-(1-p-methylthiobenzoyl-2-methyl-5-nitro-3-indolyl)-α-acetoxy acetate in the above example, there are obtained the corresponding amino substituted compounds.

EXAMPLE 12

*Benzyl-(1-p-methylthiobenzoyl-2-methyl-5-methylamino-3-indolyl)-α-acetoxy acetate*

A mixture of 0.01 mole of benzyl-(1-p-methylthiobenzoyl-2-methyl-5-amino - 3 - indolyl)-α-acetoxy acetate, 0.011 mole of methyl iodide, and 0.022 mole of sodium bicarbonate in 75 ml. of anhydrous 1,2-dimethoxyethane is heated on a steam bath under nitrogen for 6 hours. The solution is filtered and the solvent is removed in vacuo. The residue is chromatographed on a 250 gram alumina column using an ethyl acetate-ether (v./v. 0–100%) system as eluent to give benzyl-(1-p-methylthiobenzoyl-2-methyl - 5 - methylamino-3-indolyl)-α-acetoxy acetate.

Similarly, when using propyl iodide and butyl iodide in place of methyl iodide, there are obtained benzyl-(1-p-methylthiobenzoyl-2-methyl-5-propylamino-3-indolyl) - α-acetoxy acetate and benzyl-(1-p-methylthiobenzoyl-2-methyl-5-butylamino-3-indolyl)-α-acetoxy acetate, respectively.

Similarly, when using the amino compounds obtained from Example 11 in place of benzyl-(1-p-methylthiobenzoyl-2-methyl-5-amino-3-indolyl)-α-acetoxy acetate in the above example, there are obtained the corresponding methylamino compounds.

EXAMPLE 13

*Benzyl-(1-p-methylthiobenzoyl-2-methyl-5-dimethylamino-3-indolyl)-α-acetoxy acetate*

A mixture of 0.01 mole of benzyl-(1-p-methylthiobenzoyl-2-methyl-5-amino-3-indolyl)-α - acetoxy acetate, 0.022 mole of methyl iodide and 0.044 mole of sodium bicarbonate in 75 ml. of anhydrous 1,2-dimethoxyethane is heated on a steam bath under nitrogen for 6 hours. The solution is filtered and the solvent is removed in vacuo. The residue is chromatographed on a 250 gram alumina column using an ethyl acetate-ether (v./v. 0–100%) system as eluent to give benzyl-(1-p-methylthiobenzoyl-2-methyl-5-dimethylamino-3-indolyl)-α - acetoxy acetate.

Similarly, when using propyl iodide and butyl iodide in place of methyl iodide in the above example, there are obtained benzyl-(1 - p-methylthiobenzoyl-2-methyl-5-dipropylamino-3-indolyl)-α-acetoxy acetate and benzyl-(1-p - methylthiobenzoyl - 2 - methyl-5-dibutylamino-3-indolyl)-α-acetoxy acetate, respectively.

Similarly, when using the amino compounds obtained from Example 11 in place of benzyl-(1-p-methylthiobenzoyl-2-methyl-5-amino-3-indolyl)-α-acetoxy acetate in the above example, there are obtained the corresponding dimethylamino compounds.

EXAMPLE 14

*t-Butyl-(1-p-methylthiobenzoyl-2-methyl-5-hydroxy-3-indolyl)-α-acetoxy acetate*

A mixture of 0.05 mole of t-butyl-(1-p-methylthiobenzoyl-2-methyl-5-benzyloxy-3-indolyl)-α - acetoxy acetate in 200 ml. of ethanol is reduced with 10% palladium on carbon under 45 pounds of hydrogen at room temperature until the stoichiometric amount of hydrogen is absorbed. The mixture is filtered, evaporated in vacuo, and chromatographed on a silica gel column (800 grams) using ether-petroleum ether (v./v. 50–100%) as eluent. The solvent is evaporated and the product, t-butyl-(1-p-methylthiobenzoyl-2-methyl-5-hydroxy-3-indolyl)-α - acetoxy acetate, is recovered.

Similarly, when the lower alkyl (1-aroyl-benzyloxy-substituted-3-indolyl)-α-alkoxy (or α-acyloxy) acetate compounds obtained from Examples 6 and 7 are used in place of t-butyl-(1 - p - methylthiobenzoyl-2-methyl-5-benzyloxy-3-indolyl)-α-acetoxy acetate in the above example, there are obtained the corresponding hydroxy compounds.

EXAMPLE 15

*1-p-methylthiobenzoyl-2-methyl-5-methoxyindole*

A solution of 0.021 mole of 2-methyl-5-methoxy-indole and 20 ml. of dimethylformamide is added dropwise to a cold suspension of 1.0 grams (0.022 mole) of sodium hydride (52% dispersion in mineral oil) and 25 ml. of dimethylformamide. The mixture is stirred at room temperature for 20 minutes, cooled, and treated with 0.022 mole of p-methylthiobenzoyl chloride. The reaction mixture is stirred at room temperature for about 16 hours and poured into 260 ml. of ice water. The aqueous mixture is extracted with (3×250) ether. The ether extract is washed with 100 ml. of potassium bicarbonate solution and (3×100 ml.) of water. The ether layer is dried and concentrated under reduced pressure to give 1-p-methylthiobenzoyl-2-methyl-5-methoxyindole.

Similarly, when using the substituted indoles indicated in Example 2 in place of 2-methyl-5-methoxyindole in the above example, there are obtained the corresponding 1-p-methylthiobenzoyl substituted indoles.

When using the acid chlorides indicated in Example 3 in place of p-methylthiobenzoyl chloride in the above example, there are obtained the corresponding 1-aroyl-2-methyl-5-methoxyindoles.

EXAMPLE 16

*N-propyl-(1-p-methylthiobenzoyl-2-methyl-5-methoxy-3-indolyl)-glyoxalamide*

To a stirred solution of 0.005 mole of oxalyl chloride in 15 ml. of anhydrous ether is added a solution of 0.005 mole of 1-p-methylthiobenzoyl-2-methyl-5-methoxyindole and 15 ml. of ether over a period of approximately 30 minutes. The mixture is then stirred for several hours under a blanket of nitrogen. 0.015 mole of propylamine is added, and the mixture is stirred for several hours. After removal of ether, the residue is chromatographed on a 100 gram silica gel column using ether-petroleum ether (v./v. 10–100%) as eluent to give N-propyl-(1-p-methylthiobenzoyl-2-methyl-5-methoxy - 3 - indolyl) - glyoxalamide.

Similarly, the above procedure is followed using methylamine, ethylamine, butylamine, allylamine, phenylethylamine, p-chloroaniline, 1-ethyl-2-aminomethyl piperidine, benzylamine, morpholine, aniline, p-ethoxyaniline, N-hydroxyethyl piperazine, N,N-dimethylcarboxamidomethylamine, N,N-diethylaminoethylamine, ammonia, and water in place of propylamine, there are obtained the corresponding substituted amides, unsubstituted amide and free acid, respectively.

Similarly, when the 1-aroyl-2-methyl-5-methoxy-indoles and 1-p-methylthiobenzoyl substituted indoles obtained from Example 15 are used in place of 1-p-methylthiobenzoyl-2-methyl-5-methoxyindole in the above example, there are obtained the corresponding N-propyl-(1-aroyl-2-methyl-5-methoxy-3-indolyl)-glyoxalamides and N-propyl-(1-p-methylthiobenzoyl-substituted - 3 - indolyl)-glyoxalamides, respectively.

EXAMPLE 17

*N-propyl-(1-p-methylthiobenzoyl-2-methyl-5-methoxy-3-indolyl)-α-hydroxy acetamide*

A solution of 0.003 mole of N-propyl-(1-p-methylthiobenzoyl - 2 - methyl - 5 - methoxy - 3 - indolyl) - glyoxalamide and 50 ml. of methanol is cooled in an ice bath for 15 minutes and carbon dioxide is bubbled through. The solution is removed from the ice bath and to it is added a solution of 0.15 gram of sodium borohydride in 30 ml. of dimethoxyethane and 30 ml. of mehanol. The reaction mixture is stirred for one hour and carbon dioxide is continually bubbled through during that time. The solution is then filtered. The filtrate is then poured into a mixture of 250 ml. of ice water and 2 ml. of acetic acid. The filtrate is extracted with 2×150 ml. of ether. The ether extract is subsequently washed with 2×100 ml. of water, 2×50 ml. of saturated sodium bicarbonate, and 2×100 ml. of water. The ether extract is then dried over sodium sulfate and concentrated to a heavy syrup. The concentrate is then chromatographed on a silica gel column using 25% ether-petroleum ether. The product obtained after crystallization is N-propyl-(1-p-methylthiobenzoyl-2-methyl-5-methoxy-3-indolyl)-α-hydroxy acetamide.

Similarly, the above procedure is followed using the substituted glyoxalamides, unsubstituted glyoxalamides, N - propyl - (1 - aroyl - 2 - methyl - 5 - methoxy - 3 - indolyl)-glyoxalamides, and N-propyl-(1-p-methylthiobenzoyl-substituted-3-indolyl)- glyoxalamides obtained from Example 16 in place of N-propyl-(1-p-methylthiobenzoyl-2-methyl-5-methoxy-3-indolyl)-glyoxalamide in the above example, there are obtained the corresponding α-hydroxy amides. (This procedure can be use to prepare the α-hydroxy free acid; however, this compound is relatively unstable and would have to be kept at low temperatures to maintain its stability for any considerable length of time.)

I claim:
1. A compound of the formula:

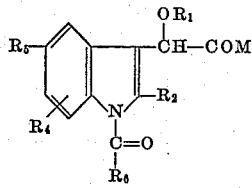

wherein:
  $R_1$ is selected from the group consisting of hydrogen, lower alkyl, lower alkenyl, lower alkynyl, benzyl phenethyl, halo lower alkyl, dihalo lower alkyl, lower alkanoyl, lower alkenoyl, lower alkynoyl, benzoyl, phenacetyl, and halo lower alkanoyl;
  $R_2$ is selected from the group consisting of lower alkenyl and lower alkyl;
  $R_4$ is selected from the group consisting of hydrogen, lower alkyl, lower alkoxy, fluorine and trifluoromethyl;
  $R_5$ is selected from the group consisting of hydroxy, lower alkyl, lower alkoxy, nitro, amino, lower alkylamino, di(lower alkyl)amino, bis(hydroxy lower alkyl)amino, 1-pyrrolidino, 4-methyl-1-piperazinyl, 4-morpholinyl, cyano, trifluoromethyl, halogen, di(lower alkyl)sulfamyl, benzylthio, lower alkylbenzylthio, lower alkoxybenzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropyl methyloxy, and cyclobutyl methyloxy;
  $R_6$ is selected from the group consisting of phenyl, naphthyl and biphenyl, and substituted phenyl, naphthyl and biphenyl wherein said substituents are selected from the group consisting of halogen, lower alkyl, lower alkylthio, lower alkoxy, trifluoromethyl, phenoxy, lower alkylphenoxy, lower alkoxyphenoxy, halogenophenoxy, di(lower alkyl)sulfamyl, cyano, trifluoromethylthio, lower alkyl sulfinyl, lower alkyl sulfonyl, benzylthio, lower alkylbenzylthio, lower alkoxybenzylthio, halogenobenzylthio, mercapto, nitro, amino, di(lower alkyl)amino, lower alkylamino, hydroxy, benzyloxy, lower alkylbenzyloxy, lower alkoxybenzyloxy, and halogenobenzyloxy in which the aroyl radical contains at least one of the above substituents; and
  M is selected from the group consisting of OH, NH₂, lower alkylamino, di(lower alkyl)amino, glycosylamino, allylamino, phenethylamino, N-ethylphenethyl amino, p-chloroanilino, 1-ethyl-2-aminomethyl piperidino, tetrahydrofurfurylamino, 1,2,5,6-tetrahydropyridino, morpholino, N-methyl-piperazino, piperazino, N-phenyl-piperazino, piperidino, benzylamino, anilino, p-ethoxyanilino, cyclohexylamino, pyrrolidino, N-hydroxyethyl-piperazino, N,N-dimethyl-carboxamidomethylamino, N,N - diethylaminoethylamino, benzyloxy, diphenylmethyloxy, triphenylmethyloxy, lower alkoxy, OZ (where Z is a sodium, potassium or calcium) and OY, where Y represents the structure:

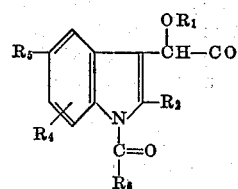

2. A compound of claim 1, wherein:
  $R_1$ is lower alkyl;
  $R_2$ is lower alkyl;
  $R_4$ is hydrogen;
  $R_5$ is lower alkoxy;
  $R_6$ is halophenyl; and
  M is hydroxy.

3. A compound of claim 1, wherein:
  $R_1$ is lower alkanoyl;
  $R_2$ is lower alkyl;
  $R_4$ is hydrogen;
  $R_5$ is lower alkoxy;
  $R_6$ is halophenyl; and
  M is hydroxy.

3. A compound of claim 1, wherein:
  $R_1$ is lower alkanoyl;
  $R_2$ is lower alkyl;
  $R_4$ is hydrogen;
  $R_5$ is lower alkoxy;
  $R_6$ is halophenyl; and
  M is hydroxy.

4. A compound of claim 1, wherein:
  $R_1$ is lower alkenyl;
  $R_2$ is lower alkyl;
  $R_4$ is hydrogen;
  $R_5$ is lower alkoxy;
  $R_6$ is halophenyl; and
  M is hydroxy.

5. A compound of claim 1, wherein:
  $R_1$ is lower alkyl;
  $R_2$ is lower alkyl;
  $R_4$ is hydrogen;
  $R_5$ is lower alkoxy;
  $R_6$ is lower alkylthiophenyl; and
  M is hydroxy.

6. A compound of claim 1, wherein:
  $R_1$ is lower alkenyl;
  $R_2$ is lower alkyl;
  $R_4$ is hydrogen;
  $R_5$ is lower alkoxy;
  $R_6$ is lower alkylthiophenyl; and
  M is hydroxy.

7. A compound of claim 1, wherein:
  $R_1$ is lower alkyl;
  $R_2$ is lower alkyl;
  $R_4$ is hydrogen;
  $R_5$ is di(lower alkyl)amino;
  $R_6$ is halophenyl; and
  M is hydroxy.

8. A compound of claim 1, wherein:
  $R_1$ is lower alkenyl;
  $R_2$ is lower alkyl;
  $R_4$ is hydrogen;
  $R_5$ is di(lower alkyl)amino;
  $R_6$ is halophenyl; and
  M is hydroxy.

9. (1 - p-chlorobenzoyl-2-methyl-5-methoxy-3-indolyl)-α-acetoxy acetic acid.

10. (1-p-chlorobenzoyl-2-methyl-5-methoxy - 3 - indolyl)-α-methoxy acetic acid.

11. (1 - p-chlorobenzoyl-2-methyl-5-methoxy - 3 - indolyl)-α-allyloxy acetic acid.

12. (1-p-methylthiobenzoyl-2-methyl-5-methoxy-3 - indolyl)-α-methoxy acetic acid.

13. (1-p-methylthiobenzoyl-2-methyl-5-methoxy-3-indolyl)-α-allyloxy acetic acid.
14. (1-p-chlorobenzoyl-2-methyl-5-dimethylamino-3-indolyl)-α-methoxy acetic acid.
15. (1-p-chlorobenzoyl-2-methyl-5-dimethylamino-3-indolyl)-α-allyloxy acetic acid.

References Cited

UNITED STATES PATENTS

| | | | |
|---|---|---|---|
| 2,825,734 | 3/1958 | Speeter | 260—319 |
| 3,038,002 | 6/1962 | Reeve | 260—319 X |
| 3,078,214 | 2/1963 | Hofmann et al. | 260—319 X |

FOREIGN PATENTS

| | | |
|---|---|---|
| 615,395 | 9/1962 | Belgium. |
| 621,313 | 2/1963 | Belgium. |

OTHER REFERENCES

Migrdichian, Organic Synthesis, vol. 1, New York, Reinhold Publishing Corp., 1957, page 78.

Reeve et al., Tetrahedron, vol. 19, August 1963, pages 1243–1249.

ALEX MAZEL, *Primary Examiner.*

M. U. O'BRIEN, J. A. NARCAVAGE,
*Assistant Examiners.*